(12) United States Patent
Matsumoto (10) Patent No.: US 11,898,847 B2
(45) Date of Patent: Feb. 13, 2024

(54) POSITION DETECTING SYSTEM AND POSITION DETECTING METHOD

(71) Applicant: SHIMIZU CORPORATION, Tokyo (JP)

(72) Inventor: Takashi Matsumoto, Tokyo (JP)

(73) Assignee: Shimizu Corporation, Tokyo (JP)

( * ) Notice: Subject to any disclaimer, the term of this patent is extended or adjusted under 35 U.S.C. 154(b) by 536 days.

(21) Appl. No.: 17/262,822

(22) PCT Filed: Feb. 19, 2019

(86) PCT No.: PCT/JP2019/006040
§ 371 (c)(1),
(2) Date: Jan. 25, 2021

(87) PCT Pub. No.: WO2020/026480
PCT Pub. Date: Feb. 6, 2020

(65) Prior Publication Data
US 2021/0247192 A1    Aug. 12, 2021

(30) Foreign Application Priority Data
Jul. 31, 2018 (JP) .................... 2018-144086

(51) Int. Cl.
*G01C 21/20* (2006.01)
*G01S 17/06* (2006.01)
*G01S 7/481* (2006.01)

(52) U.S. Cl.
CPC .......... *G01C 21/206* (2013.01); *G01S 7/4811* (2013.01); *G01S 17/06* (2013.01)

(58) Field of Classification Search
CPC ...... G01S 17/89; G01S 7/4811; G01S 7/4802; G01S 17/06; G01S 5/14; G01C 21/206; G08G 1/005
See application file for complete search history.

(56) References Cited

U.S. PATENT DOCUMENTS

2007/0092161 A1*  4/2007  Aratani ............... G06T 7/73
                                                    382/286
2008/0225137 A1*  9/2008  Kubo .................. H04N 5/772
                                                    348/157
(Continued)

FOREIGN PATENT DOCUMENTS

JP    2008186375 A    8/2008
JP    2011214834 A   10/2011
(Continued)

OTHER PUBLICATIONS

Yamao, Sosuke "Information Processing Device, Database Generation Device, Method, and Program, and Storage Medium" Jul. 19, 2018, WO2018131163 (Year: 2018).*
(Continued)

*Primary Examiner* — Sang H Nguyen
(74) *Attorney, Agent, or Firm* — Hoffmann & Baron, LLP (57) ABSTRACT

This position detecting system is provided with: a target object shape extracting part which extracts a target object as a target object shape from a three-dimensional shape in an indoor space, and acquires a position of the target object shape; an identification information acquisition part which acquires, on the basis of data reported from the target object, target object identification information for identifying the target object; and an identification information associating part which associates the target object shape with the target object identification information.

16 Claims, 5 Drawing Sheets

(56) References Cited

U.S. PATENT DOCUMENTS

| | | | |
|---|---|---|---|
| 2009/0022369 A1* | 1/2009 | Satoh | G01B 21/04 |
| | | | 382/106 |
| 2009/0267823 A1 | 10/2009 | Konishi et al. | |
| 2011/0184685 A1 | 7/2011 | Tanigawa et al. | |
| 2011/0205358 A1 | 8/2011 | Aota et al. | |
| 2012/0051598 A1* | 3/2012 | Ikeda | G01B 11/002 |
| | | | 382/103 |
| 2013/0094706 A1* | 4/2013 | Nakazato | G06T 7/55 |
| | | | 382/103 |
| 2013/0108112 A1* | 5/2013 | Aratani | G06T 7/73 |
| | | | 382/103 |
| 2015/0042645 A1* | 2/2015 | Kawaguchi | G01S 7/4808 |
| | | | 345/419 |
| 2015/0269735 A1* | 9/2015 | Tateno | G06V 10/462 |
| | | | 382/199 |
| 2015/0363935 A1* | 12/2015 | Motoyoshi | G06T 7/75 |
| | | | 382/103 |
| 2016/0292889 A1* | 10/2016 | Niwayama | G06T 7/75 |
| 2017/0028561 A1* | 2/2017 | Yamada | B25J 19/023 |

FOREIGN PATENT DOCUMENTS

| | | |
|---|---|---|
| WO | 2007058302 A1 | 5/2007 |
| WO | 2009113265 A1 | 9/2009 |
| WO | 2011027557 A1 | 3/2011 |

OTHER PUBLICATIONS

International Search Report for Application No. PCT/JP2019/006040, dated May 7, 2009.

* cited by examiner

| TARGET OBJECT SHAPE IDENTIFICATION INFORMATION | | |
|---|---|---|
| TIME STAMP | TARGET OBJECT SHAPE POSITION | DIMENSIONAL INFORMATION |
| ****** | ****** | ****** |
| ****** | ****** | ****** |
| ****** | ****** | ****** |
| ⋮ | ⋮ | ⋮ |

FIG. 3B

| TARGET OBJECT IDENTIFICATION INFORMATION | |
|---|---|
| TIME STAMP | TARGET OBJECT ESTIMATED POSITION INFORMATION |
| ****** | ****** |
| ****** | ****** |
| ****** | ****** |
| ⋮ | ⋮ |

FIG. 3C

| TARGET OBJECT SHAPE IDENTIFICATION INFORMATION | | | |
|---|---|---|---|
| TIME STAMP | TARGET OBJECT SHAPE POSITION | DIMENSION INFORMATION | TARGET OBJECT IDENTIFICATION INFORMATION |
| ****** | ****** | ****** | ****** |
| ****** | ****** | ****** | ****** |
| ****** | ****** | ****** | ****** |
| ⋮ | ⋮ | ⋮ | ⋮ |

POSITION DETECTING SYSTEM AND POSITION DETECTING METHOD

CROSS-REFERENCE TO RELATED APPLICATIONS

This application is the U.S. National Phase Application of International Application No. PCT/JP2019/006040, filed on Feb. 19, 2019, and asserts priority to Japanese Patent Application No. 2018-144086 filed on Jul. 31, 2018, all of which are hereby incorporated by reference in their entirety.

TECHNICAL FIELD

The present invention relates to a position detecting system and a position detecting method for performing position detection of a target object in an indoor space.

Priority is claimed on Japanese Patent Application No. 2018-144086, filed Jul. 31, 2018, the content of which is incorporated herein by reference.

BACKGROUND ART

In the related art, various methods for detecting positions of target objects in buildings or the like have been studied. For example, there are many position estimating techniques using communication terminals such as beacons, wireless tags, WiFi electromagnetic waves, geomagnetism, indoor messaging systems (IMESs), personal handy-phone systems (PHSs), or the like and many configurations as combinations thereof (see Patent Document 1, for example).

However, the aforementioned detection techniques are techniques for estimating positions using the intensity of electromagnetic waves or the like received by communication terminals provided at target objects, and it may not be possible to detect accurate positions of target objects since the positions are obtained through estimation.

According to the aforementioned detection techniques, although it is possible to estimate the positions of target objects that move along with the communication terminals, it is not possible to recognize accurate sizes of the target objects.

Further, since it is only possible to estimate the positions of target objects, it is not possible to detect the size of a target object, such as whether operators who are carrying the communication terminals are moving alone or whether the operators are carrying a large load on a carriage.

Therefore, in a case in which the aforementioned techniques for detecting target objects are used for navigation in a building, for example, it is not possible to ascertain the size of a moving target object and thus to perform a process of excluding locations having restrictions in size for passing therethrough from a navigation route.

As a result, the sizes of target objects for which navigation can be performed are limited, and it is not possible to use the techniques to carry loads in buildings.

On the other hand, there are detection techniques for addressing automatic driving techniques for vehicles and performing position detection of target objects that are present in the surroundings of corresponding vehicles with high accuracy in units of mm using cameras and three-dimensional measurement devices for position detection. According to such position detecting methods, it is possible to detect positions of target objects that are present in the surroundings of vehicles, to acquire three-dimensional shapes of the target objects, and to apply the methods to navigation and the like of robots moving in buildings.

PRIOR ART DOCUMENT

Patent Document

[Patent Document 1]
Japanese Patent Application, First Publication No. 2011-214834

SUMMARY OF INVENTION

Problems to be Solved by the Invention

However, according to the aforementioned position detection techniques using cameras and three-dimensional measurement devices, it is not possible to detect identification information indicating attributes of target objects as the technique in Patent Document 1.

According to the position detection technique in Patent Document 1, due to notification of information allowing a mobile terminal to estimate a position (for example, an electromagnetic wave reception intensity at a beacon, and the like) and identification information of a mobile terminal itself to a system side, a result of estimating the position of the mobile terminal itself on the basis of the identification information can be obtained.

It is thus possible for the system side to easily acquire an association between the position of a target object and identification information of the target object.

On the other hand, according to the position detection techniques using cameras and three-dimensional measurement devices, the positions and the three-dimensional shapes of target objects in a three-dimensional space are obtained from captured images, measurement information, and the like.

Therefore, since the aforementioned position detection techniques are adapted to obtain the positions of the target objects without receiving any notifications for information for obtaining the positions of the target objects from the target objects, identification information of the target objects is not acquired.

Therefore, since it is not possible to acquire the identification information although it is possible to detect the positions and to obtain the three-dimensional shapes, the target objects cannot be identified.

In other words, since the identification information of the target objects cannot be acquired, it is not possible to obtain attribute information regarding the identity of target objects even if the positions to which targets with three-dimensional shapes have moved are accurately obtained, and it is also not possible to ascertain notification destinations that are to be notified of positions estimated in navigation or the like.

The present invention was made in view of such circumstances, and an object thereof is to provide a position detecting system and a position detecting method capable of obtaining an accurate position and a three-dimensional shape of a target object and easily associating identification information for identifying the three-dimensional shape as the target object.

Means for Solving the Problems

The present invention was made in order to solve the aforementioned problem, and a position detecting system according to the present invention includes: a target object shape extracting part configured to extract a target object as a target object shape from a three-dimensional shape in an indoor space and acquire a position of the target object shape; an identification information acquisition part configured to acquire target object identification information for identifying the target object on the basis of data provided as a notification from the target object; and an identification information associating part configured to associate the target object shape with the target object identification information.

Also, a position detecting method according to the present invention includes: a target object shape extracting process of extracting a target object as a target object shape from a three-dimensional shape in an indoor space and acquiring a position of the target object shape; an identification information acquisition process of acquiring target object identification information for identifying the target object on the basis of data provided as a notification from the target object; and an identification information associating process of associating the target object shape with the target object identification information.

Advantageous Effects of the Invention

According to the present invention, it is possible to provide a position detecting system and a position detecting method capable of obtaining an accurate position and a three-dimensional shape of a target object and easily associating identification information for identifying the three-dimensional shape as the target object.

PREFERRED EMBODIMENTS FOR CARRYING OUT THE INVENTION

Figure 1:
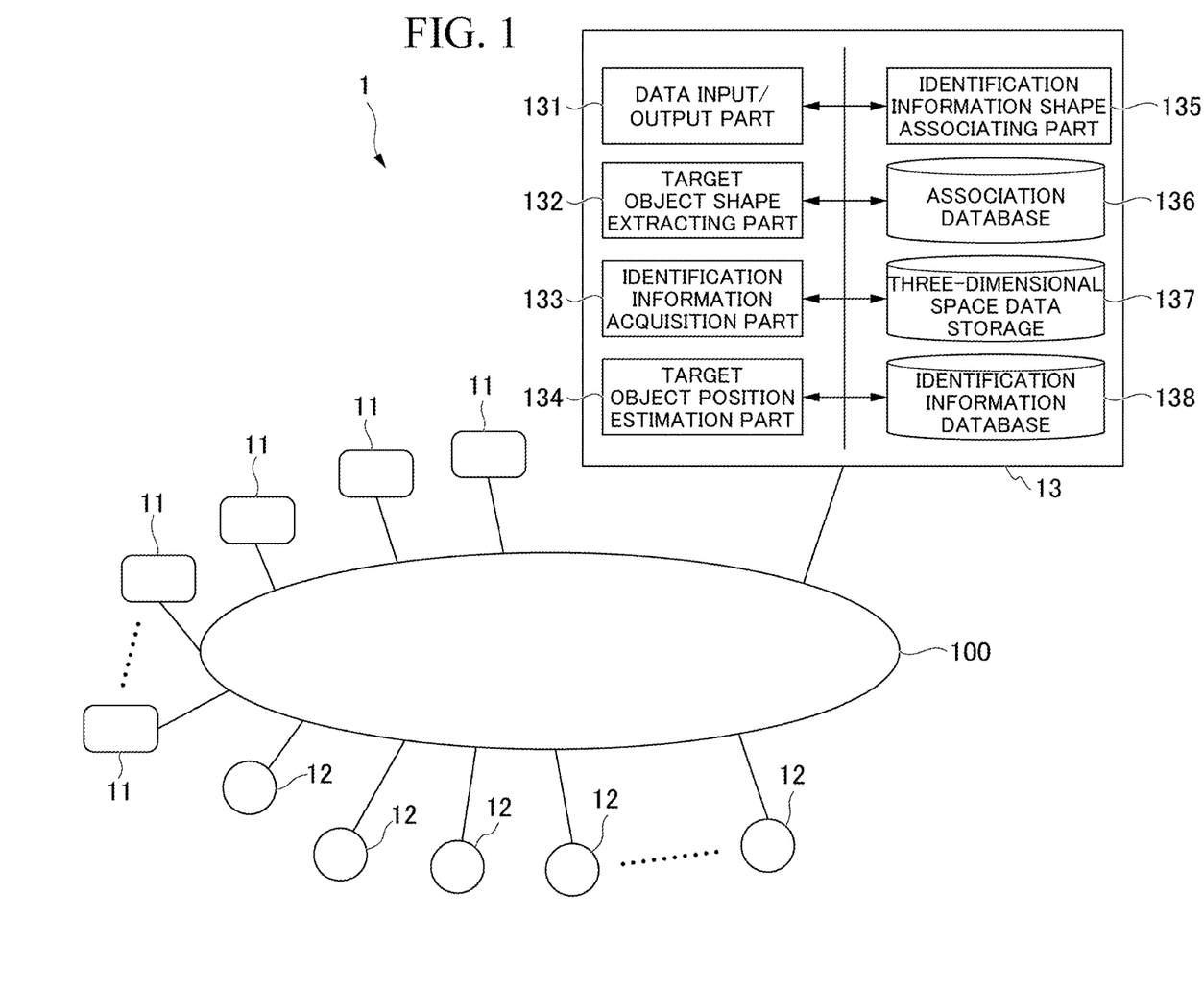
FIG. 1 is an overview block diagram illustrating a configuration example of a position detecting system according to an embodiment of the present invention.

Hereinafter, a position detecting system according to an embodiment of the present invention will be described with reference to the drawings. FIG. 1 is an overview block diagram illustrating a configuration example of a position detecting system according to an embodiment of the present invention.

A position detecting system 1 includes each of a three-dimensional measurement device 11, a transmitting device 12, and a position detecting server 13. In the present embodiment, a plurality of three-dimensional measurement devices 11 and a plurality of transmitting devices 12 are included in each measurement range in an indoor facility. Each of the three-dimensional measurement devices 11 and the position detecting server 13 transmits and receives data via a network 100 such as a local area network (LAN) in a building, for example. Also, the transmitting devices 12 may be connected to the network 100.

The following description of the present embodiment will be given using laser range scanners (LRSs) as the three-dimensional measurement devices 11 and using beacon transmitters as the transmitting devices 12, for example. However, a configuration in which the position of a target object is estimated without using the beacon transmitters may be employed as will be described later. Although an indoor space of a building will be described as an example in the present embodiment, the configuration may be used in a semi-outdoor space on land over which a building is built, for example, an outdoor passage, a roofed passage, an open passage, a porch, a deck, a terrace, a balcony, a veranda, an outdoor passage, porch, and a deck.

The three-dimensional measurement devices 11 scan a laser, measures a three-dimensional shape of a space in a measurement range (a range that the laser light reaches), and outputs a result of measurements as dot group data to the position detecting server 13 via the network 100.

The transmitting devices 12 are disposed on walls, ceilings, and the like in an indoor space and emit beacon signals including transmitting device identification information that is identification information of the devices themselves with a predetermined electromagnetic wave intensity at cycles of predetermined time intervals set in advance.

The position detecting server 13 includes each of a data input/output part 131, a target object shape extracting part 132, an identification information acquisition part 133, a target object position estimation part 134, an identification information shape associating part 135, an association database 136, a three-dimensional space data storage 137, and an identification information database 138.

The data input/output part 131 extracts measurement range information indicating a measurement range in which the three-dimensional measurement device 11 is disposed, from measurement three-dimensional shape data successively supplied from the three-dimensional measurement devices 11 at predetermined time intervals. In addition, the data input/output part 131 writes and stores, in the three-dimensional space data storage 137, the measurement three-dimensional shape data, time stamps indicating times at which the measurement three-dimensional shape data is acquired, and range information of the measurement three-dimensional shape measurement data in an associated manner.

Also, the data input/output part 131 writes and stores, in the three-dimensional space data storage 137, position estimation information that is supplied (provided as a notification) from a wireless device carried by the target object or mounted in the target object and that is for estimating the position of the wireless device as an estimated position in association with time stamps indicating times at which the data is acquired. The data input/output part 131 inputs the position estimation information in synchronization with the measurement three-dimensional shape data. Here, the position estimation information includes identification information of the wireless device, the electromagnetic wave intensity when a beacon signal transmitted by a transmitting device 12 is received by the wireless device, and transmitting device identification information for identifying the transmitting device 12 that has transmitted the beacon signal.

The target object shape extracting part 132 extracts a target object shape that is a three-dimensional shape of a target object in a measurement range from the measurement three-dimensional shape data. Here, the target object shape extracting part 132 selects and reads background three-dimensional shape data of a measurement range selected from a combination of three-dimensional measurement devices stored in the three-dimensional space data storage 137, performs a background differencing process on the measurement three-dimensional shape data using the background three-dimensional shape data, and extracts the target object shape. Here, the background three-dimensional shape data indicates an indoor three-dimensional shape in each measurement range obtained by acquiring the measurement three-dimensional shape data in a state in which no target object is present and calibrating the measurement three-dimensional shape data with three dimensions-computer assisted design (3D-CAD) data in design of the building. Also, the background three-dimensional shape data is set for each closed space of a three-dimensional space such as an indoor space or a passage in the measurement range. Also, not only an indoor closed space but also a semi-closed space (the aforementioned semi-outdoor space) described above may be a target in the measurement range.

In other words, the target object shape extracting part 132 compares the measurement three-dimensional shape data with the background three-dimensional shape data, extracts a three-dimensional shape that is similar to the three-dimensional shape in the background three-dimensional shape data, and excludes the similar three-dimensional shape from the measurement three-dimensional shape data. In this manner, the target object shape extracting part 132 extracts the three-dimensional shape of the target object in the indoor space within the measurement range as a target object shape and extracts the position thereof as a target object shape position. Then, the target object shape extracting part 132 applies identification information (target object shape identification information) to the extracted target object shape and writes and stores, in the association database 136, each of the time stamp of the measurement three-dimensional shape data from which the target object shape has been extracted, the target object shape position, and dimensional information thereof.

The identification information acquisition part 133 extracts identification information of the wireless device carried by (or included in) the target object from the position estimation information provided as a notification by the wireless device and associates the identification information with a time stamp when the position estimation information is input, thereby obtaining target object identification information.

The target object position estimation part 134 estimates, as target object estimated position information, the position of the wireless device in the indoor space from transmitting device identification information from the position estimation information and electromagnetic wave intensity corresponding to the transmitting device identification information. Here, the target object position estimation part 134 performs estimation of the position of the wireless device carried by the target object, that is, the target object estimated position by extracting position information corresponding to the transmitting device identification information of the position estimation information and the electromagnetic wave intensity, with reference to a position estimation table indicating position information associated with each piece of transmitting device identification information stored in the three-dimensional space data storage 137 and the electromagnetic wave intensity of the beacon signal emitted by each transmitting device. Then, the target object position estimation part 134 writes and stores, in the association database 136, the target object estimated position along with a time stamp in association with the target object identification information extracted by the identification information acquisition part 133.

Figure 2A:
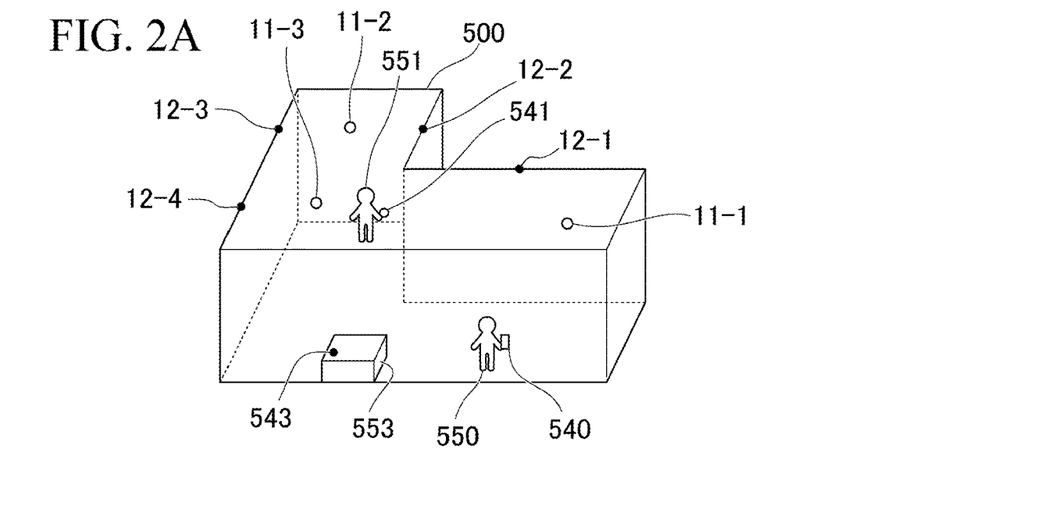
FIG. 2A is a diagram for explaining extraction of a target object shape and target object identification information of a target object.
Figure 2B:
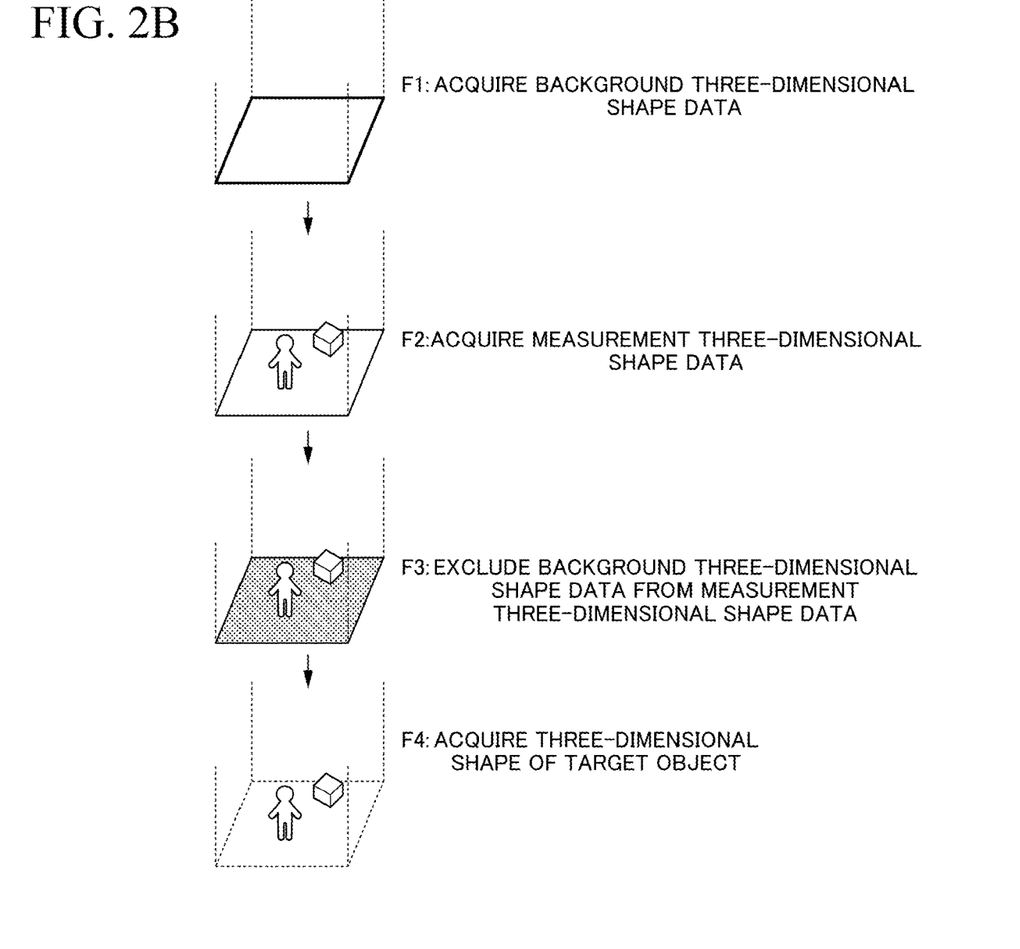
FIG. 2B is a diagram for explaining extraction of the target object shape and the target object identification information of the target object.

FIGS. 2A and 2B are diagrams for explaining extraction of the target object shape and the target object identification information of the target object. FIG. 2A is a conceptual diagram for explaining acquisition of the measurement three-dimensional shape data and the position estimation information. In FIG. 2A, each of three-dimensional measurement devices 11-1 to 11-3 and each of beacon transmitting devices 12-1 to 12-4 are disposed inside a room 500 that is a predetermined measurement range in an indoor space. Walking persons 550 and 551 who are target objects carry wireless devices 540 and 541, respectively. Also, a wireless device 543 is provided in a target object shape 553 of a table (desk) that is a target object. Each of the three-dimensional measurement devices 11-1 to 11-3 acquires the three-dimensional shape of the inside of the room 500 as three-dimensional shape data and outputs the acquired measurement three-dimensional shape data to the position detecting server 13. Each of the wireless devices 540, 541, and 543 outputs an electromagnetic wave intensity of the beacon signal received from each of the transmitting devices 12-1 to 12-4 and the transmitting device identification information along with identification information (target object identification information) of the device itself to the position detecting server 13.

FIG. 2B is a diagram for explaining a process for extracting the target object shape from the measurement three-dimensional shape data. The target object shape extracting part 132 extracts identification information for identifying the three-dimensional measurement device applied to the measurement three-dimensional shape data and reads the background three-dimensional shape data corresponding to the identification information from the three-dimensional space data storage 137 (Process F1).

Then, the target object shape extracting part 132 synthesizes the measurement three-dimensional shape data from each of the three-dimensional measurement devices 11-1 to 11-3 and generates the measurement three-dimensional shape data from which the target object shape is extracted (Process F2).

The target object shape extracting part 132 performs a background differencing process of excluding the three-dimensional shape in the background three-dimensional shape data from the three-dimensional shape in the measurement three-dimensional shape data (Process F3).

The target object shape extracting part 132 regards three-dimensional shapes 601 and 602 of the difference as a result of the exclusion in Process F3 as target object shapes extracted from the measurement three-dimensional shape data (Process F4).

Figure 3A:
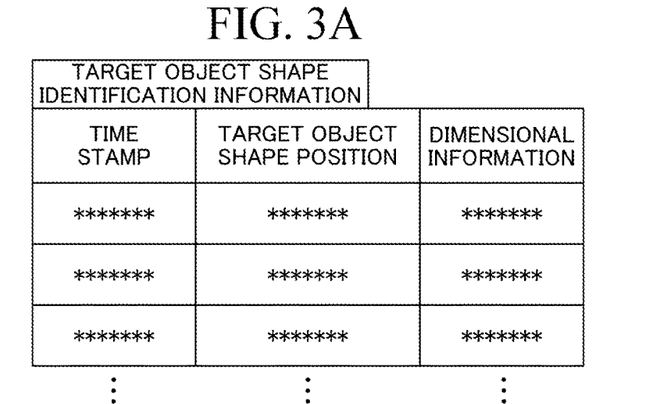
FIG. 3A is a diagram illustrating a configuration example of a table stored in an association database 136.
Figure 3B:
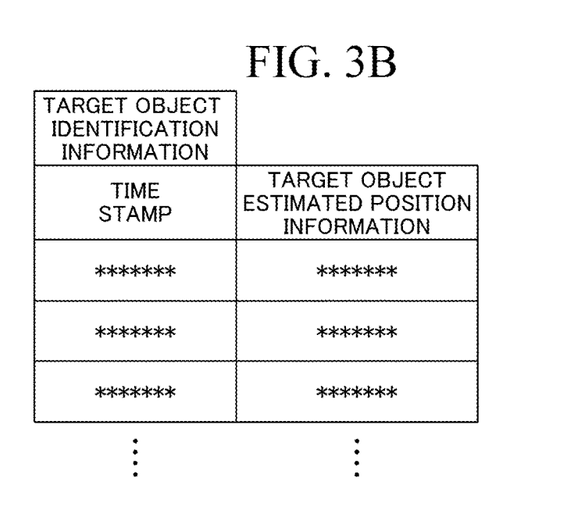
FIG. 3B is a diagram illustrating a configuration example of a table stored in the association database 136.
Figure 3C:
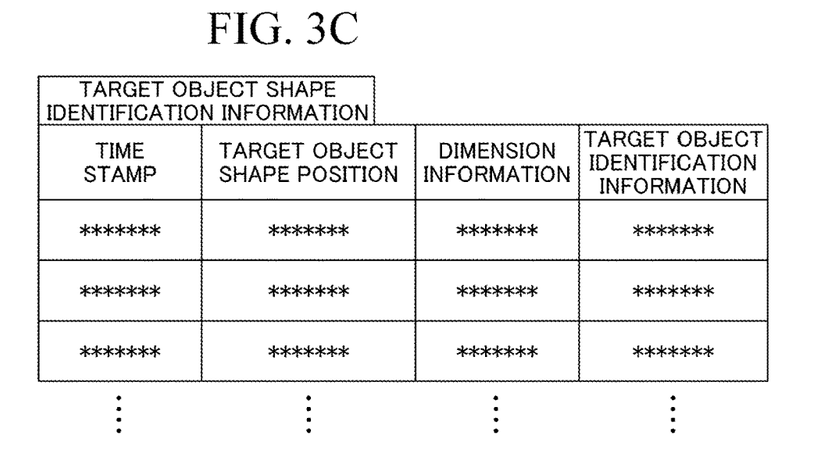
FIG. 3C is a diagram illustrating a configuration example of a table stored in the association database 136.

FIGS. 3A to 3C are diagrams illustrating a configuration example of a table stored in the association database 136. FIG. 3A illustrates a configuration example of a target object shape table, which is provided for each piece of target object shape identification information. In FIG. 3A, sections for a time stamp, a target object shape position, and a dimensional information are provided for each record in the target object shape table. The time stamp indicates a clock time when the measurement three-dimensional shape data from which the target object shape position has been obtained is input. The target object shape position indicates a coordinate position at which the target object shape is present in a coordinate system in the indoor space. The dimensional information indicates the size of the target object, for example, each dimension such as the height, the width, and the depth of a minimum cube surrounding the target object shape. Also, the target object shape position is a position of the center (or the center of gravity) of the cube surrounding the target object shape, for example.

FIG. 3B illustrates a configuration example of a target object estimated position table, which is provided for each piece of target object identification information. In FIG. 3B, sections for a time stamp and target object estimated position information are provided for each record in the target object estimated position table. The time stamp is a clock time at which position estimation information, which is synchronized with the target object shape table in FIG. 3A, from which the target object estimated position information has been obtained, is input. The target object estimated position information indicates the position of the target object estimated from the electromagnetic wave intensity of the beacon signal received by the wireless device.

FIG. 3C illustrates a configuration example of an identification information shape association table, which is provided for each piece of target object shape identification information. In FIG. 3A, sections for a time stamp, a target object shape position, dimensional information, and target object identification information are provided for each record in the identification information shape association table. The time stamp is a clock time when measurement three-dimensional shape data from which the target object shape position has been obtained is input. The target object shape position indicates a coordinate position at which the target object shape is present in the coordinate system in the indoor space. The dimensional information indicates the size of the target object, for example, each dimension such as the height, the width, and the depth of a minimum cube surrounding the target object shape. Also, the target object shape position is, for example, the position of the center of the cube surrounding the target object shape.

Returning to FIG. 1, the identification information shape associating part 135 performs a process of associating the target object shape with the target object identification information. Here, an association range in which the associating process is performed is set in advance, and the identification information shape associating part 135 performs a different associating process depending on whether target object shape is present or a plurality of target object shapes are present in the association range around the position indicated by the target object estimated position information at the center. In other words, in a case in which one target object shape is present in the association range around the target object estimated position information at the center, the identification information shape associating part 135 associates the target object shape with the target object identification information corresponding to the target object estimated position information.

On the other hand, in a case in which a plurality of target object shapes are present in the association range around the position indicated by the estimated position information at the center, the identification information shape associating part 135 obtains each of the moving direction and the moving speed (velocity vector) of the target object shape with reference to the target object shape table in the association database 136. Similarly, the identification information shape associating part 135 obtains each of the moving direction and the moving speed of the wireless device indicated by the target object identification information with reference to the target object estimated position table in the association database 136. Also, the identification information shape associating part 135 obtains a correlation between the moving direction and the moving speed of the target object shape and the moving direction and the moving speed of each wireless device for each target object shape, regards the target object shape and the wireless device with a high correlation as the same target object, and associates the target object identification information of the wireless device with the target object shape.

Figure 4A:
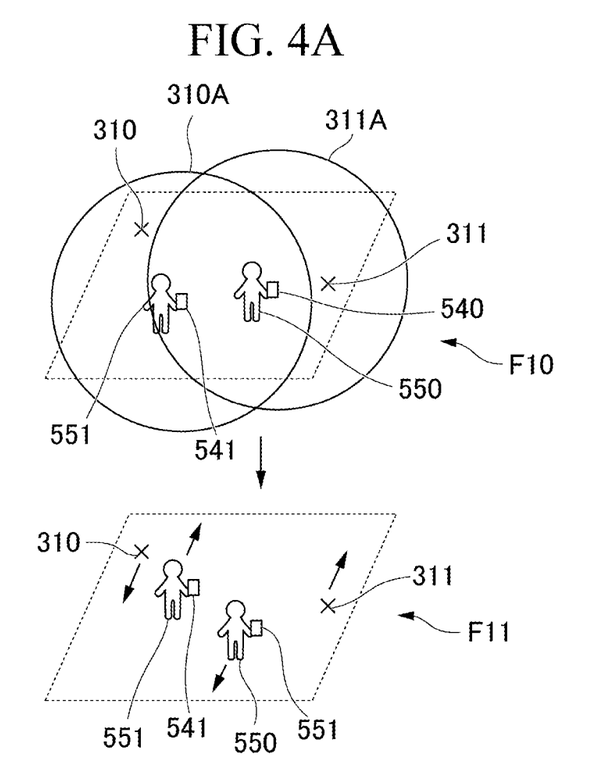
FIG. 4A is a conceptual diagram illustrating a process of associating a target object shape with target object identification information.
Figure 4B:
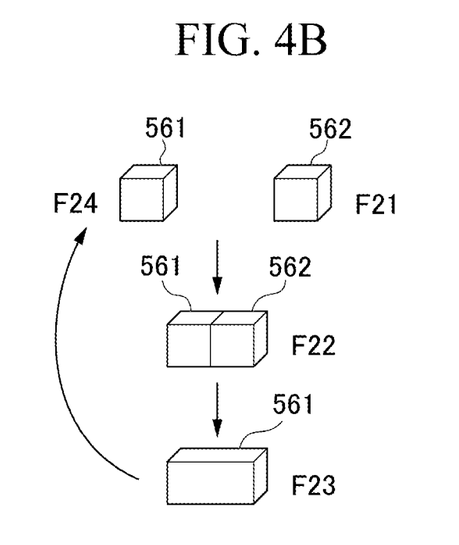
FIG. 4B is a conceptual diagram illustrating the process of associating the target object shape with the target object identification information.

FIGS. 4A and 4B are conceptual diagrams illustrating a process for associating the target object shape with the target object identification information. FIG. 4A is a diagram illustrating the associating process performed by the identification information shape associating part 135 in a case in which a plurality of target object shapes are present in the association range. Here, walking persons 550 and 551 move with wireless devices 540 and 541 carried with them, respectively. Target object estimated position information of the wireless device 540 indicates a position 310, and the walking persons 550 and 551 are included as target object shapes in an association range 310A around the position 310 at the center. Similarly, target object estimated position information of the wireless device 541 indicates a position 311, and the walking persons 550 and 551 are included as target object shapes in an association range 311A around the position 311 at the center. As described herein, in a case in which position estimation is performed on the basis of an intensity of received electromagnetic waves of a beacon signal from each of the wireless devices 540 and 541, the estimated target object estimated position information may be significantly different from the actual position of each of the wireless devices 540 and 541. In this case, the identification information shape associating part 135 detects that a plurality of target object shapes are present in the association range around the estimated position information at the center (Process F10).

Therefore, the identification information shape associating part 135 obtains a correlation of the target object shape of the walking person 550 and the moving direction and the moving speed of each of the positions 310 and 311. Also, the identification information shape associating part 135 obtains the correlation of the target object shape of the walking person 551 and the moving direction and the moving speed of each of the positions 310 and 311. In this manner, the identification information shape associating part 135 associates target object identification information corresponding to the position 310 with the target object shape of the walking person 550 with a high aforementioned correlation value and associates target object identification information corresponding to the position 311 with the target object shape of the walking person 551 (Process F11).

FIG. 4B is a conceptual diagram for explaining a process for associating a target object shape and target object identification information when a target object shape is divided and merged.

A case in which the target object shape extracting part 132 has detected each of target object shapes 561 and 562 will be described.

(Case #1)

A case in which a target object indicated by a target object shape 561 includes a wireless device and a target object indicated by a target object shape 562 does not include a wireless device.

(Process F21)

In a case in which each of the target object shapes 561 and 562 has been detected, the target object shape extracting part 132 manages the target object shapes 561 and 562 with target object shape identification information applied thereto. The identification information shape associating part 135 associates target object identification information with the target object shape 561 while the identification information shape associating part 135 does not associate any target object identification information with the target object shape 561.

(Process F22)

In a case in which the target object shape extracting part 132 detects that the target object shapes 561 and 562 have been integrated, the target object shape extracting part 132 performs management using target object shape identification information of the target object shape 561 to which the target object identification information has been applied. Then, the target object shape extracting part 132 changes the dimensional information in the target object shape table in the association database 136 from the dimension of the target object shape 561 to the dimension of the target object shape that is the combined target object shapes 561 and 562.

(Process F23)

If a predetermined time has elapsed, the identification information shape associating part 135 regards the three-dimensional shape of the integrated target object shapes 561 and 562 as the target object shape 561. At this time, the identification information shape associating part 135 stores and leaves, in the association database 136, a history that the shape that has been combined with the target object shape 561 to form the three-dimensional shape is the target object shape 562. Then, the target object shape extracting part 132 does not update data of the target object shape 562 in the target object shape table at and after the time stamp at this timing after the aforementioned predetermined time elapses.

(Process F24)

In a case in which the target object shape extracting part 132 detects that the target object shape 561 has been split into two three-dimensional shapes, the target object shape extracting part 132 detects that the target object shape 561 has been split from the target object shape 562 with reference to the history. Then, the target object shape extracting part 132 restarts updating of the data of the target object shape 562 in the target object shape table at and after the time stamp at this timing. The identification information shape associating part 135 stores and leaves, in the association database 136, a history that the three-dimensional shape split from the target object shape 561 is the target object shape 562.

(Case #2)

A case in which target objects indicated by target object shapes 561 and 562 include wireless devices.

(Process F21)

In a case in which each of the target object shapes 561 and 562 has been detected, the target object shape extracting part 132 manages the target object shapes 561 and 562 with target object shape identification information applied thereto. The identification information shape associating part 135 associates target object identification information with each of the target object shapes 561 and 562.

(Process F22)

In a case in which the target object shape extracting part 132 detects that the target object shapes 561 and 562 have been integrated, the target object shape extracting part 132 manages the integrated target object shapes 561 and 562 using three-dimensional shape identification information of either the integrated target object shape 561 or 562. For example, the target object shape extracting part 132 performs management using the target object shape identification information of a larger target object shape (that is, the one with a larger volume). Then, the target object shape extracting part 132 changes the dimensional information in the target object shape table in the association database 136 from the dimension of the target object shape 561 to the dimension of the three-dimensional shape that is the combined and integrated target object shapes 561 and 562.

(Process F23)

If a predetermined time has elapsed, the identification information shape associating part 135 regards the three-dimensional shape of the integrated target object shapes 561 and 562 as the target object shape 561. Also, the identification information shape associating part 135 writes each target object identification information in the section for the target object identification information in the identification information shape association table. At this time, the identification information shape associating part 135 stores and leaves, in the association database 136, a history that the three-dimensional shape combined with the target object shape 561 is the target object shape 562. Then, the target object shape extracting part 132 does not update data of the target object shape 562 in the target object shape table at and after the time stamp at this timing after the aforementioned predetermined time elapses.

(Process F24)

In a case in which the target object shape extracting part 132 detects that the target object shape 561 has been split into two three-dimensional shapes, the target object shape extracting part 132 detects that the target object shape 561 has been split from the target object shape 562 with reference to the history. Then, the target object shape extracting part 132 restarts the updating of the data of the target object shape 562 in the target object shape table at and after the time stamp at this timing.

The identification information shape associating part 135 stores and leaves, in the association database 136 a history indicating that the three-dimensional shape split from the target object shape 561 is the target object shape 562.

In regard to the aforementioned processes, a case in which when an operator places a burden on a carriage and carry them in Process F21 when the burden is carried in, the operator who handles the carriage corresponds to the target object shape 561 and the burden placed on the carriage corresponds to the target object shape 562, for example, is conceivable. In this case, the target object shape extracting part 132 detects each of the operator who handles the carriage and the burden placed on the carriage as a three-dimensional shape and manages the three-dimensional shape with target object shape identification information applied thereto.

Then, the operator who handles the carriage and the burden placed on the carriage are detected as one three-dimensional shape by the target object shape extracting part 132 by the operator placing the burden on the carriage in Process F22. Also, the operator who handles the carriage and the burden placed on the carriage are detected as two three-dimensional shape by the target object shape extracting part 132 by the operator unloading the burden from the carriage in Process F24.

Also, since the target object shape 553 in the case illustrated in FIG. 2A is a table (furniture), the table is not moved for a while after being carried in and disposed. Therefore, in a case in which the target object shape position does not move over a predetermined time in the target object shape table in the association database 136, the target object shape extracting part 132 performs a process for synthesizing the target object shape 553 with background three-dimensional shape data. Then, the target object shape extracting part 132 writes and stores, in the three-dimensional space data storage 137, the new background three-dimensional shape data with which the target object shape 553 has been synthesized. In this manner, since there is no need to extract the target object shape 553, it is possible to reduce a load of the target object shape extracting part 132. Also, in a case in which the target object shape 553 is carried out of the room, it is possible to detect that the target object shape 553 has been moved on the basis of a difference between the measurement three-dimensional shape data and the background three-dimensional shape data.

Figure 5:
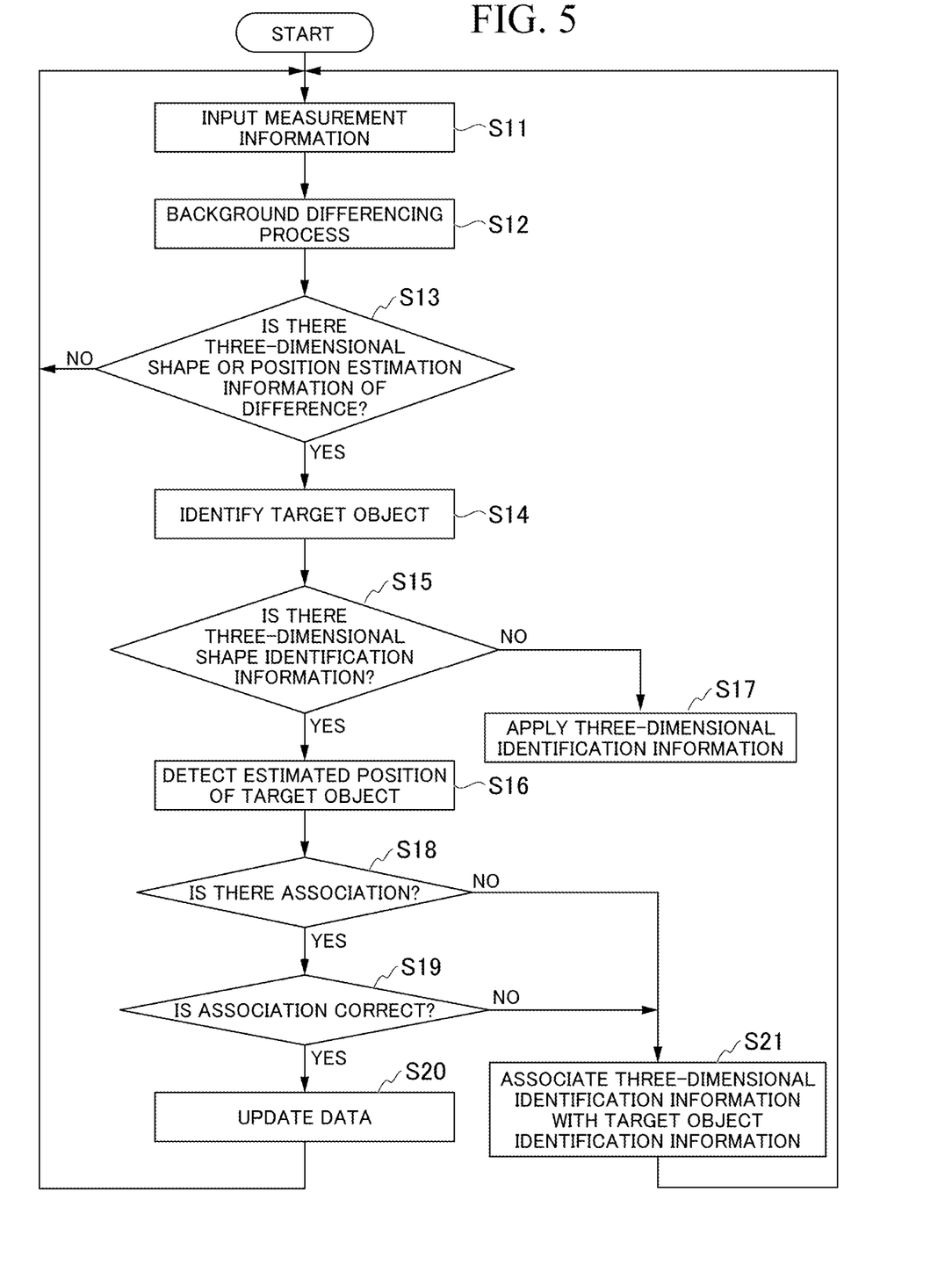
FIG. 5 is a flowchart illustrating an operation example of the process of associating target object identification information with a target object shape performed by the position detecting system according to an embodiment of the present invention.

FIG. 5 is a flowchart illustrating an operation example of a process for associating target object identification information with a target object shape performed by the position detecting system according to an embodiment of the present invention.

(Step S11)

The data input/output part 131 inputs, as measurement information, each of measurement three-dimensional shape data and position estimation information successively supplied at every predetermined time from the three-dimensional measurement device 11.

(Step S12)

The target object shape extracting part 132 detects target object shapes in the measurement three-dimensional shape data through a background differencing process using background three-dimensional shape data.

(Step S13)

In a case in which the target object shapes have been extracted from the measurement three-dimensional shape data, or in a case in which position estimation information has been input, the target object shape extracting part 132 moves on to the process in Step S14. On the other hand, in a case in which no target object shapes have been extracted and the position estimation information has not been input, the target object shape extracting part 132 returns to the process in Step S11.

(Step S14)

The target object shape extracting part 132 performs a process of identifying the extracted target object shapes with target object shapes that have already been described in the target object shape table.

(Step S15)

In the process of identification, the target object shape extracting part 132 determines whether or not the extracted target object shapes are included in the target object shape table, that is, whether target object shape identification information has been applied to the extracted target object shapes.

(Step S16)

The target object position estimation part 134 obtains target object estimated position information and target object identification information of wireless devices that are the target objects, from position estimation information provided as notifications from the wireless devices.

(Step S17)

The target object shape extracting part 132 applies target object shape identification information to the target object shapes to which no target object shape identification information has been applied, from among extracted target object shapes. The target object shape extracting part 132 performs a tracking process (an identification process based on acquisition of correlations of the velocity vectors, the dimensions of the three-dimensional shapes, and the like) for each target object shape and determines whether or not each target object shape is a newly extracted target object shape or a target object shape that has already been extracted.

(Step S18)

The identification information shape associating part 135 determines whether or not target object identification information has been associated (whether there has been an association) with the extracted target object shape, with reference to the identification information shape association table. At this time, the identification information shape associating part 135 moves on to the process in Step S19 in a case in which there has been an association, and moves on to the process in Step S21 in a case in which there has not been an association.

(Step S19)

The identification information shape associating part 135 determines whether or not the same target object identification information has been associated with a plurality of target object shapes or whether or not dimensions of the target object shapes have been changed, and also determines whether or not each correlation of the moving direction and the moving speed of each target object shape and the moving direction and the moving speed of each wireless device (target object) is equal to or greater than a preset correlation value. In other words, the identification information shape associating part 135 determines whether or not a combination of the dimension of the target object shape, the target object shape identification information, the target object identification information, and the like are similar to the immediately previous combination, and there is a correlation of the target object shape and the moving direction and the moving speed of the wireless device (target object) that is equal to or greater than a predetermined level (whether or not there is a correct association). At this time, in a case of a correct association, the identification information shape associating part 135 moves on to the process in Step S20 since there has been no change in target object shape, there has been no change in combination of the target object shape and the target object identification information, and there is a correlation of the target object shape and the moving direction and the moving speed of the wireless device (target object) that is equal to or greater than the predetermined level. On the other hand, in a case of an incorrect association, the identification information shape associating part 135 moves on to the process in Step S21 since there has been integration due to combination or splitting of target object shapes, movement of target object shapes in target object identification information, or a change in combination of the target object shape and the target object identification information, or the combination itself of the target object shape and the wireless device (target object) is incorrect.

(Step S20)

The identification information shape associating part 135 updates the target object shape position in the identification information shape association table with reference to the target object shape table in the association database 136 corresponding to the time stamp and returns to the process in Step S11.

(Step S21)

Since the process described in FIGS. 4A and 4B is performed by the target object shape extracting part 132, the identification information shape associating part 135 changes each of the target object shape position, the dimensional information, and the target object identification information in the identification information shape association table with reference to the target object shape table in the association database 136.

As described above, according to the present embodiment, since the correct position of the target object and the dimension of the three-dimensional shape are obtained, the target object identification information for identifying the three-dimensional shape as a target object is obtained from the wireless device that the target object carries, and the target object identification information is associated with the target object shape that is the three-dimensional shape, it is possible to easily obtain the correct position, the dimension, and the target object identification information of the target object. Also, according to the present embodiment, since an attribute information table in which the target object identification information and the target object attribute information are associated is provided in the identification information database 138, it is possible to obtain an attribute of the target object, to obtain information regarding what the target object is in a case in which the target object is a burden or regarding belonging or the like in a case in which the target object is a human, and to use the information for a process for carrying the burden, security management, or the like.

Although the LRS has been described as an example of the three-dimensional measurement device in the present embodiment, a plurality of calibrated imaging devices may image the indoor space, restore a three-dimensional shape from a plurality of pieces of imaged data captured at different imaging positions and imaging angles, and use the restored three-dimensional as measurement three-dimensional shape data.

Although the target object identification information is extracted from the position estimation information from the wireless device in the present embodiment, a configuration in which an attached object indicating the target object identification information is added to a position of the target object at which the target object identification information can be visually recognized and the target object identification information is read by the imaging device may be employed in a case in which the target object is a burden, for example. In this case, the position and the dimension of the target object shape are measured by the LRS, the target object identification information of the target object is read by the imaging device, and the target object identification information is associated with the target object shape. As another configuration, a configuration in which when a three-dimensional shape is restored from a plurality of pieces of imaged data captured at different imaging positions and imaging angles, the target object identification information is read from the imaged data and the target object identification information is associated with the target object shape may be employed.

Although the position estimation of the target object is performed using electromagnetic wave intensity of the beacon received by the wireless device in the present embodiment, a configuration in which a magnetic sensor is provided in the target object and the position of the target object is estimated from an association table between geomagnetism and the position (coordinate position) in the building stored in the three-dimensional space data storage 137, from geomagnetic data acquired by the magnetic sensor may be employed.

Although the position estimation of the target object is performed using electromagnetic wave intensity of the beacon received by the wireless device in the present embodiment, a configuration in which a motion sensor is mounted in the target object, the motion sensor detects motion of the target object, the wireless device transmits the result of the detection along with identification information of the device itself to the position detecting server 13, and the target object position estimation part 134 estimates the position after the target object moves from each of the moving distance and the moving direction of the target object, which are the result of the detection performed by the motion sensor, and a map of the indoor space may be employed.

Also, the process for associating the target object identification information with the target object shape may be performed by recording a program for realizing functions of the position detecting server 13 in FIG. 1 in a computer readable recording medium and causing a computer system to read and execute the program recorded in the recording medium. Note that the "computer system" described here includes hardware such as an OS and a peripheral device.

Also, the "computer system" includes a homepage providing environment (or a displaying environment) in a case in which a WWW system is used.

In addition, the "computer readable recording medium" refers to a portable medium such as a flexible disk, a magneto-optical disk, a ROM, or a CD-ROM or a storage device such as a hard disk incorporated in the computer system. Further, the "computer readable recording medium" includes a recording medium that dynamically holds the program in a short period of time, such as a communication line in a case in which the program is transmitted via a network such as the Internet or a communication line such as a telephone line and a recording medium that holds the program for a specific time, such as a volatile memory inside a computer system that is a server or a client in that case. Also, the aforementioned program may be for realizing a part of the aforementioned functions or may be able to realize the aforementioned functions in combination with a program that has already been recorded in the computer system.

Although the embodiment of the present invention has been described in detail with reference to the drawings, the specific configuration is not limited to the embodiment and includes designs and the like without departing from the gist of the present invention.

INDUSTRIAL APPLICABILITY

The present invention can widely be applied to a position detecting system and a position detecting method, and it is possible to obtain a correct position and a three-dimensional shape of a target object and to easily associate identification information for identifying the three-dimensional shape as the target object.

DESCRIPTION OF THE REFERENCE SYMBOLS

11: Three-dimensional measurement device
12: Transmitting device
13: Position detecting server
100: Network
131: Data input/output part
132: Target object shape extracting part
133: Identification information acquisition part
134: Target object position estimation part 135: Identification information shape associating part
136: Association database
137: Three-dimensional space data storage

The invention claimed is:

1. A position detecting system comprising:
a computing device; and
a non-transitory computer-readable memory storing instructions that, when executed by the computing device, cause the computing device to perform operations comprising:
an object shape extracting operation of extracting an object shape of an object from a three-dimensional shape obtained by a three-dimensional measuring device and acquiring the object shape and a position of the object;
an identification information acquisition operation of acquiring target object identification information related to a target object, which is one of a plurality of the objects, wherein a motion sensor is mounted on the target object;
a position estimation operation of outputting position estimation information that estimates the position of the target object, wherein the position estimation information is estimated from each of a moving distance and a moving direction of the target object detected by the motion sensor; and
an identification information associating operation of associating the target object identification information with the object shape by using the position of the object acquired by the object shape extracting operation and the position estimation information.

2. The position detecting system according to claim 1, wherein the position estimation information is estimated from a reception strength of electromagnetic waves transmitted from each of a plurality of transmitters.

3. The position detecting system according to claim 1, wherein the position estimation information is estimated from a measured value of a geomagnetism measured by a magnetic sensor provided in a wireless device provided in the target object.

4. The position detecting system according to claim 1, wherein the identification information associating operation further includes associating the target object identification information with a target object shape of the target object, based on a history of the target object identification information associated with the object.

5. A position detecting system comprising:
a computing device; and
a non-transitory computer-readable memory storing instructions that, when executed by the computing device, cause the computing device to perform operations comprising:
an object shape extracting operation of extracting an object shape of an object from a three-dimensional shape obtained by a three-dimensional measuring device and to acquire the object shape and a position of the object;
an identification information acquisition operation of acquiring target object identification information related to a target object, which is one of a plurality of the objects;
a position estimation operation of outputting position estimation information that estimates the position of the target object; and
an identification information associating operation of associating the target object identification information with the object shape by using the position of the object acquired by the object shape extraction operation and the position estimation information, wherein the identification information associating operation further includes associating the target object identification information with a target object shape of the target object, based on a correlation between a velocity vector of the target object obtained from the position estimation information and a velocity vector of the object obtained from output of the object shape extracting operation.

6. The position detecting system according to claim 5, wherein the position estimation information is estimated from a reception strength of electromagnetic waves transmitted from each of a plurality of transmitters.

7. The position detecting system according to claim 5, wherein the position estimation information is estimated from a measured value of a geomagnetism measured by a magnetic sensor provided in a wireless device provided in the target object.

8. The position detecting system according to claim 5, wherein the identification information associating operation further includes associating the target object identification information with the target object shape, based on a history of the target object identification information associated with the object.

9. A position detecting method comprising:
an object shape extracting process of extracting an object shape from a three-dimensional shape obtained by a three-dimensional measuring device, and acquiring the object shape and a position of the object;
an identification information acquisition process of acquiring target object identification information related to a target object, which is one of a plurality of the objects;
a position estimation process of outputting position estimation information that estimates the position of the target object, wherein the position estimation information is estimated from each of a moving distance and a moving direction of the target object detected by a motion sensor mounted on the target object; and
an identification information associating process of associating the target object identification information with the object shape by using the position of the object acquired by the object shape extraction process and the position estimation information.

10. The position detecting method according to claim 9, wherein the position estimation information is estimated from a reception strength of electromagnetic waves transmitted from each of a plurality of transmitters.

11. The position detecting method according to claim 9, wherein the position estimation information is estimated from a measured value of a geomagnetism measured by a magnetic sensor provided in a wireless device provided in the target object.

12. The position detecting method according to claim 9, wherein the identification information associating process further includes associating the target object identification information with a target object shape of the target object, based on a history of the target object identification information associated with the object.

13. A position detecting method comprising:
an object shape extracting process of extracting an object shape from a three-dimensional shape obtained by a three-dimensional measuring device, and acquiring the object shape and a position of the object;

an identification information acquisition process of acquiring target object identification information related to a target object, which is one of a plurality of the objects;

a position estimation process of outputting position estimation information that estimates the position of the target object; and an identification information associating process of associating the target object identification information with the object shape by using the position of the object acquired by the object shape extraction process and the position estimation information, wherein the identification information associating process further includes associating the target object identification information with a target object shape of the target object, based on a correlation between a velocity vector of the target object obtained from the position estimation information and a velocity vector of the object obtained from output of the object shape extracting process.

14. The position detecting method according to claim 13, wherein the position estimation information is estimated from a reception strength of electromagnetic waves transmitted from each of a plurality of transmitter.

15. The position detecting method according to claim 13, wherein the position estimation information is estimated from a measured value of a geomagnetism measured by a magnetic sensor provided in a wireless device provided in the target object.

16. The position detecting method according to claim 13, wherein the identification information associating process further includes associating the target object identification information with the target object shape, based on a history of the target object identification information associated with the object.

* * * * *